United States Patent [19]

Hattori et al.

[11] Patent Number: 4,905,215

[45] Date of Patent: Feb. 27, 1990

[54] SYSTEM FOR READING INFORMATION FROM TWO STORAGE LAYERS OF AN OPTICAL DISK IN DIFFERENT MANNERS

[75] Inventors: Yutaka Hattori, Aichi; Yukimasa Yoshida, Nagoya, both of Japan

[73] Assignee: Brother Kogyo Kabushiki Kaisha, Aichi, Japan

[21] Appl. No.: 132,188

[22] Filed: Dec. 14, 1987

[30] Foreign Application Priority Data

Dec. 22, 1986 [JP] Japan .............. 61-197174[U]

[51] Int. Cl.$^4$ .............. G11B 13/00; G11B 7/12
[52] U.S. Cl. .................. 369/14; 369/110; 369/13; 360/114
[58] Field of Search .......... 369/14, 13, 110, 112, 369/108; 360/114, 59; 358/341; 250/225

[56] References Cited

U.S. PATENT DOCUMENTS

| | | | |
|---|---|---|---|
| 3,235,672 | 2/1966 | Beguin | 369/121 |
| 3,665,483 | 5/1972 | Becker et al. | 346/1.1 |
| 3,781,905 | 12/1973 | Bernal et al. | 365/122 |
| 4,219,704 | 8/1980 | Russell | 369/108 |
| 4,546,463 | 10/1985 | Opheij et al. | 369/110 |
| 4,558,440 | 12/1985 | Tomita | 369/13 |
| 4,559,573 | 12/1985 | Tanaka et al. | 360/131 |
| 4,569,035 | 2/1986 | Tomita | 369/13 |
| 4,612,587 | 9/1986 | Kaneko et al. | 360/59 |
| 4,670,865 | 6/1987 | Hatano | 369/13 |
| 4,683,502 | 7/1987 | Higashi et al. | 358/342 |
| 4,721,368 | 1/1988 | Deguchi et al. | 369/110 |
| 4,737,947 | 4/1988 | Osata et al. | 360/114 |

FOREIGN PATENT DOCUMENTS

| | | |
|---|---|---|
| 128960 | 2/1978 | European Pat. Off. |
| 2578083 | 8/1986 | France .............. 369/13 |
| 8402603 | 3/1971 | Int'l Pat. Institute . |
| 8605621 | 4/1976 | Int'l Pat. Institute . |
| 56-68937 | 6/1981 | Japan . |
| 58-125244 | 7/1983 | Japan . |
| 58-150146 | 9/1983 | Japan . |
| 61-107552 | 5/1986 | Japan .............. 360/114 |
| 61-107553 | 5/1986 | Japan . |
| 61-206947 | 9/1986 | Japan .............. 369/110 |
| 2017379 | 11/1975 | United Kingdom . |

OTHER PUBLICATIONS

IEEE Transactions of Magnetics, vol. MAG-3, No. 3, 9/67, pp. 433-452.
IBM Technical Disclosure Bulletin "Flying Optical Head for Disc Applications", vol. 23, No. 7A, Dec. 1980, pp. 2994-2995, by E. G. Lean.
IBM Technical Disclosure Bulletin, "Photochromic Disck File", by B. Kazan, vol. 14, No. 5, Oct. 1971, pp. 1362-1354.
IBM Technical Disclosure Bulletin, "GaAs Laser Array & Fiber-Optic Detector Array for Disc Application", vol. 232, No. 7A, Dec. 1980, pp. 2992-2993 by E. G. Lean.

*Primary Examiner*—Steven L. Stephan
*Assistant Examiner*—Hoa T. Nguyen
*Attorney, Agent, or Firm*—Oliff & Berridge

[57] ABSTRACT

An information-reproducing system for reading information from a plurality of storage layers of an optical disk. The system includes a light source for irradiating the optical disk with a radiation, a first information-reproducing device for reading information from one of the plurality of storage layers, based on a change in an amount of the radiation reflected by the one storage layer, and a second information-reproducing device for reading information from another of the storage layers, based on a change in an angle of Kerr rotation of the radiation reflected by the above-indicated another storage layer.

12 Claims, 2 Drawing Sheets

SYSTEM FOR READING INFORMATION FROM TWO STORAGE LAYERS OF AN OPTICAL DISK IN DIFFERENT MANNERS

BACKGROUND OF THE INVENTION

1. Field of the invention

The present invention relates to an information reproducing system for reading out information from an optical recording medium such as an optical disk which has a plurality of storage layers parallel to its plane.

2. Discussion of the Prior Art

An optical disk having a plurality of information storage layers is known to improve the density of information stored per unit area of the disk. For example, Laid-open Publication No. 61-107552 (published on May 26, 1986) of Japanese Patent Application No. 59-228743 proposes a magneto-optical disk which has a plurality of magneto-optical storage layers. The subject matter of the above-identified Japanese Patent Application is disclosed in U.S. patent application Ser. No. 792 591 filed Oct. 29, 1985, assigned to the assignee of the present application. According to this magneto-optical disk, information may be written on and read from the individual magneto-optical storage layers, whereby the density of information recordable per unit area of the disk is drastically increased.

However, a conventional optical disk having two or more storage layers as indicated above requires corresponding light sources for emitting laser beams having different wavelengths for reading recorded information from the respective storage layers, respectively. Further, this conventional system requires two or more sets of detectors adapted to the different wavelengths of the laser beams reflected by the respective storage layers, so that the information can be read based on a change in the Kerr rotation angles of the reflected beams having the different wavelengths. Hence, the conventional information reading or reproducing system tends to be complicated in construction and expensive.

SUMMARY OF THE INVENTION

It is therefore an object of the present invention to provide a simplified information-reproducing system capable of reading information from a plurality of storage layers of an optical disk.

The above object may be attained according to the principle of the present invention, which provides an information-reproducing system for reading information from a plurality of storage layers of an optical disk, comprising means for irradiating the optical disk with a radiation; first information-reproducing means for reading information from one of the plurality of storage layers, based on a change in an amount of the radiation reflected by the above-indicated one storage layer; and second information-reproducing means for reading information from another of the plurality of storage layers, based on a change in an angle of Kerr rotation of the radiation reflected by the above-indicated another storage layer.

In the instant information-reproducing system having the first and second information-reproducing means, the information recorded on the two storage layers can be reproduced by the first information-reproducing means based on the amount or intensity of the reflected radiation, and by the second information-reproducing means based on the Kerr rotation angle of the reflected radiation having the same wavelength. In other words, the same light source or irradiating means adapted to produce a radiation having a predetermined wavelength can be used for two storage layers of the optical disk, since a change in the amount of the radiation reflected by one of the two storage layers represents the information recorded on that one storage layer, while a change in the Kerr rotation angle of the radiation reflected by the other storage layer represents the information on that other storage layer, irrespective of the wavelength of the radiation produced by the light source. These two different types of optical information can be detected concurrently, by the first and second information-reproducing means. Therefore, the present system does not require two sets of detector means which are conventionally needed to detect reflected radiations having different wavelengths used for different storage layers.

According to one feature of the invention, the plurality of storage layers of the optical disk consist of the above-indicated one storage layer and the above-indicated another storage layer. The Kerr rotation angle of the radiation reflected by the above-indicated another storage layer will not be affected by the above-indicated one storage layer when the reflected radiation is transmitted through that one storage layer. Further, the amount of the radiation reflected by the one storage layer will not be affected by the above-indicated another storage layer when the reflected radiation is transmitted through that another storage layer. Therefore, the thicknesses of the two storage layers and an intermediate layer provided therebetween will not significantly influence the reflected radiations received by the first and second information-reproducing means. Accordingly, the instant system does not require such a high dimensional accuracy of the optical disk as conventionally required. This means comparatively easy manufacture of the optical disk, and consequently a reduced cost of the manufacture.

In one form of the above feature of the invention, video information is suitably stored on the optical disk. Namely, image signals of the video information are stored on the above-indicated one storage layer, while sound signals of the video information are stored on the above-indicated another storage layer.

According to another aspect of the invention, there is provided an information-reproducing system for reading information from a plurality of storage layers of an optical disk, comprising: (a) a laser source for irradiating the optical disk with a linearly polarized laser beam; (b) a half mirror disposed in a light path defined between the laser source and the optical disk, for reflecting the laser beam reflected by the optical disk; (c) a beam splitter for splitting the laser beam reflected by the half mirror, into a first beam and a second beam which have polarization planes perpendicular to each other; (d) a first optical sensor and a second optical sensor which are operable to receive the first and second beams and produce a first and a second output signal, respectively; (e) a differential amplifier operable to receive the first and second output signals from the first and second optical sensors, and amplify a difference between the first and second output signals, thereby producing an output signal indicative of a change in the angle of Kerr rotation of the radiation reflected by one of the storage layers of the optical disk; and (f) an adder operable to add the first and second output signals from the first and second optical sensors, and produce an output signal indicative of a change in the amount of the radiation reflected by another of the storage layers of the optical disk.

According to one feature of the above aspect of the invention, the system further comprises a ½ wavelength plate disposed between the half mirror and the beam splitter.

According to another feature of the same aspect of the invention, the beam splitter includes another half mirror operable to provide the above-indicated first and second beams, and a pair of analyzers whose polarization planes are perpendicular to each other. The pair of analyzers are operable to transmit the first and second beams therethrough toward the first and second optical sensors.

In accordance with a further aspect of the invention, there is provided an information-reproducing system for reading information from two storage layers of an optical disk, comprising: (a) a first laser source for producing a first linearly polarized laser beam; (b) an object lens for converging the first linearly polarized laser beam on one of the two storage layers of the optical disk; (c) a first half mirror disposed in a light path defined between the first laser source and the object lens, for reflecting the first laser beam reflected by the one storage layer; (d) a second half mirror disposed in a light path defined between the first laser source and the object lens; (e) a second laser source for emitting a second linearly polarized laser beam toward the second half mirror such that the second laser beam is reflected by the second half mirror and converged on the other of the two storage layers of the optical disk through the object lens, the second laser beam having a wavelength different from that of the first laser beam, and a polarization plane perpendicular to that of the second laser beam, the first half mirror reflecting the second laser beam reflected by the other storage layer; (f) a beam splitter for splitting each of the first and second laser beams reflected by the respective two storage layers, into two beams whose polarization planes are perpendicular to each other; and (g) a first optical sensor and a second optical sensor which are operable to receive the two beams and produce a first and a second output signal, respectively.

According to a still further aspect of the invention, there is provided an information-reproducing system for reading information from two storage layers of an optical disk, comprising: (a) a first laser source for producing a first linearly polarized laser beam; (b) an object lens for converging the first linearly polarized laser beam on one of the two storage layers of the optical disk; (c) a half mirror disposed in a light path defined between the first laser source and the object lens, for reflecting the first laser beam reflected by the one storage layer; (d) a first dichroic mirror disposed in a light path defined between the first laser source and the object lens; (e) a second laser source for emitting a second linearly polarized laser beam toward the first dichroic mirror such that the second laser beam is reflected by the first dichroic mirror and converged on the other of the two storage layers of the optical disk through the object lens, the second laser beam having a wavelength different from that of the first laser beam, and a polarization plane perpendicular to that of the second laser beam, the half mirror reflecting the second laser beam reflected by the other storage layer; (f) a second dichroic mirror for splitting each of the first and second laser beams respectively reflected by the two storage layers, into two beams which have different wavelengths and whose polarization planes are perpendicular to each other; and (g) a first optical sensor and a second optical sensor which are operable to receive the two beams and produce a first and a second output signal, respectively.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
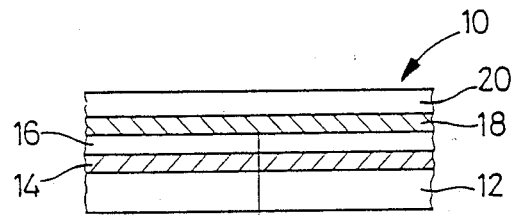
FIG. 1 is a schematic view illustrating the principle of operation of one embodiment of an information-reproducing system of the present invention for reading information from an optical disk.

Referring first to FIG. 1, reference numeral 10 generally designates an information storage or memory medium in the form of an optical disk. This optical disk 10 has a laminar structure which consists of a transparent substrate 12, a first storage layer 14, an intermediate non-magnetic layer 16, a second storage layer 18 and an adhesive layer 20. The four layers 14, 16, 18 and 20 are formed in this order on one of opposite surfaces of the substrate 12. The transparent substrate 12 may be formed of a glass material, transparent resin, or other transparent material. In this specific embodiment, the substrate 12 is formed of an acrylic resin such as polymethyl methacrylate (PMMA). The intermediate non-magnetic layer 16 is provided to protect the thin magnetic film of the first storage layer 14 from chemical changes (such as oxidation), and is formed on the first storage layer 14 by sputtering, spin-coating or other technique. The non-magnetic layer 16 is made of a transparent non-magnetic material, such as aluminum nitride (AlN), silicon oxide (SiO), silicon dioxide ($SiO_2$), metallic silicon (Si) or radiation-curable resin. If necessary, another non-magnetic layer may be provided between the substrate 12 and the first storage layer 14. However, these non-magnetic layers may be eliminated if the chemical changes of the first storage layer 12 are hardly anticipated.

The first storage layer 14 is formed on the substrate 12 by sputtering or other methods, by using a magneto-optical material which has a relatively high magneto-optical effect. For instance, the storage layer 14 is formed of amorphous GdTbFe, TbFe, TbFeCo, GdCo or GdDyFe, polycrystalline MnCuBi, monocrystalline $TbFeO_3$, or rare earth iron garnet. In this specific embodiment, the first storage layer 14 serves as a storage layer from which information is read out based on a change in the Kerr rotation angle of a radiation reflected by that storage layer.

The second storage layer 18 serves as a storage layer from which information is read out based on a change in the amount or intensity of a radiation reflected by that storage layer. The intensity of the reflected radiation varies according to a change in the reflectance of the local areas of the recording surface. This change in the intensity occurs due to the presence of pits or small recesses formed on the recording surface, or due to a change in the crystal phase of the storage layer. In the former case, the second storage layer 18 is made of a material such as TeC, whose surface is recessed upon exposure to a converged laser radiation. In the latter case, the storage layer 18 is made of a material such as TeOx, whose local portions may have a varying crystal phase and therefore a varying reflectance.

The constructed optical disk 10 is rotated by a suitable driving device, about an axis which is vertical, for example. When information is written on the optical disk 10, a controlled laser light produced by a suitable recording device is converged or focused on the first and second storage layers 14, 18. Described more specifically, information is written on the first storage layer 14 by first locally heating the recording spots with a laser light, and then allowing the heated spots to cool in a magnetic field while controlling the direction of the magnetic field according to the information to be written. Namely, the information is written by local magnetization of the magneto-optical material of the first storage layer 14 in one of opposite directions normal to the plane of the layer. When information is written on the second storage layer 18, the recording surface is locally heated by a laser light, and the heated local spots or areas are destructively recessed, or the crystal phase of the heated spots is changed, whereby the reflectance of the recording surface is locally changed. Thus, information may be recorded on the first and second storage layers 14, 18 of the optical disk 10.

When the information is read out from the optical disk 10, the appropriate storage layer 14, 18 is irradiated by a laser beam produced by a semiconductor laser element 22 as indicated in FIG. 1. The laser beam is incident upon the optical disk 10, through a half mirror 24 and an object lens 26 which are disposed between the laser element 22 and the optical disk 10. The incident laser beam is reflected by the surface of the first storage layer 14 The polarization plane of the reflected laser beam is slightly rotated by a given angle which depends upon the direction of magnetization of the specific spot from which the information is read out. Namely, the Kerr rotation angle is changed according to the recorded information. Also, the incident laser beam partially passes through the first storage layer 14, and is reflected by the surface of the second storage layer 18 The amount of the light reflected by the local recording spots on the storage layer 18 is changed according to the presence of pits or recesses at the specific spots, or depending upon the crystal phase of the spots. As described above, the laser beam reflected by the first storage layer 14 has a varying angle of the Kerr rotation, while the beam reflected by the second storage layer 18 has a varying intensity. These reflected light beams travel through the object lens 26, and are reflected by the half mirror 24, so that the reflected beams are incident upon a beam splitter 28. This beam splitter 28 reflects linearly polarized light of each incident light beam having a predetermined polarization plane, so that the reflected beam is incident upon a first optical sensor 30. The beam splitter 28 allows transmission therethrough of linearly polarized light of the incident light beam whose polarization plane is perpendicular to that of the reflected beam. The linearly polarized light transmitted through the beam splitter 28 is incident upon a second optical sensor 32.

Figure 2:
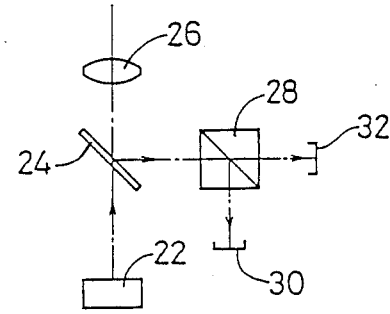
FIG. 2 is a view showing a circuit for processing output signals from a first and a second optical sensor, to read the information from the optical disk.
Figure 2:
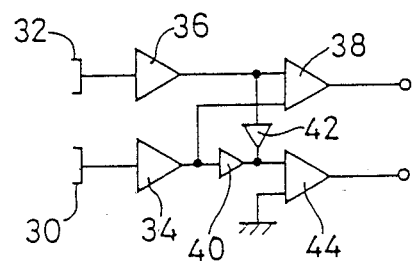

The first and second optical sensors 30 and 32 produce output signals which are processed by a circuit as shown in FIG. 2. Described in greater detail, the output signals from the first and second optical sensors 30, 32 are amplified by respective amplifiers 34, 36, and the amplified signals are applied to respective inputs of a differential amplifier 38. An output of the differential amplifier 38 represents the information on the optical disk 10, which is represented by the above-indicated change in the Kerr rotation angle, that is, the information recorded on the first storage layer 14. The outputs of the amplifiers 34, 36 are also applied to one of two inputs of an amplifier 44 through respective buffers 40, 42. The other input of the amplifier 44 is grounded, so that the buffers 40, 42 and the amplifier 44 cooperate to act as an adder. An output of the amplifier 44 represents the information on the optical disk 10, which is represented by the change in the amount of the reflected laser beam, that is, the information recorded on the second storage layer 18. In the present embodiment, the buffers 40, 42 and amplifier 44 contribute to providing first information-reproducing means for reading information from the second storage layer 18, while the differential amplifier 38 contributes to providing second information-reproducing means for reading information from the first storage layer 14.

In the instant optical disk 10, the amount or intensity of the light beam reflected by the second storage layer 18, which represents the information on the second storage layer 18, is not influenced by the first storage layer 14 when the light beam reflected by the second storage layer 18 is transmitted through the first storage layer 14. Further, even if the positions of the first and second storage layers 14, 18 are reversed with respect to each other, the Kerr rotation angle of the light beam reflected by the first storage layer 14, which angle represents the information on the first storage layer 14, is not influenced by the second storage layer 18 when the light beam reflected by the first storage layer 14 is transmitted through the second storage layer 18. Therefore, the information recorded on the first storage layer 14, and the information recorded on the second storage layer 18, can be read out or reproduced by using a single light source in the form of the semiconductor laser element 22. In other words, it is not necessary to use two light sources which generate light beams having different wavelengths. Further, it is not necessary to use two sets of detector means adapted to detect the Kerr rotation angle for the two different wavelengths. Accordingly, the instant information reading or reproducing system can be simplified in construction, and available at a reduced cost. Moreover, a variation in the thicknesses of the first and second storage layers 14, 18 and the intermediate non-magnetic layer 16 provided therebetween will not significantly affect the optical information of the light beams reflected by the storage layers 14, 18. Consequently, the optical disk 10 can be comparatively easily manufactured at a reduced cost.

Furthermore, the instant arrangement does not require a conventionally used dichroic mirror for reflecting a certain wavelength of the incident radiation for reading one storage layer, while allowing another wavelength of the radiation to pass therethrough for reading another storage layer. In this sense, too, the instant system can be simplified, and the cost of manufacture can be lowered.

The optical disk 10 is suitably used for recording video signals, such that the image signals are written on the first storage layer 14, while the sound signals are written on the second storage layer 18, for example. According to the illustrated arrangement, the recorded image and sound signals can be concurrently retrieved from the respective first and second storage layers 14, 18.

Referring to FIGS. 3-6, other embodiments of the invention will be described. The same reference numerals as used in FIG. 1 are used in FIGS. 3-6 to identify the corresponding components, and no description of these components will be given to avoid redundancy. These modified embodiments use the same circuit as shown in FIG. 2, to process the output signals from the first and second optical sensors 30, 32.

Figure 3:
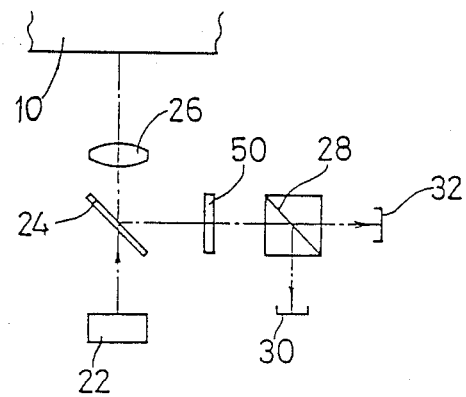
FIGS. 3, 4, 5 and 6 are schematic views showing other embodiments of the information-reproducing system according to the invention, alternative to the embodiment of FIG. 1.

In the modified embodiment of FIG. 3, a ½ wavelength plate 50 is disposed between the half mirror 24 and the beam splitter 28, for changing the polarization plane of the light beam incident upon the beam splitter 28, by a suitable angle with respect to the plane of the beam splitter, in order to increase the S/N ratio of the output signals from the beam splitter 28.

Figure 4:
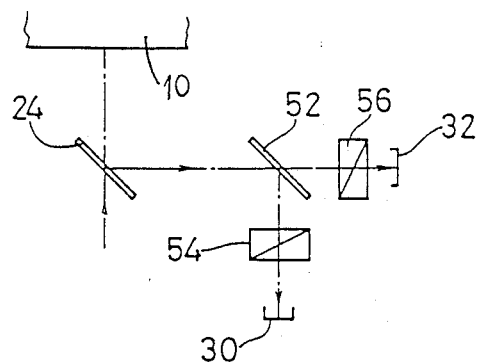

In the modified embodiment of FIG. 4, a half mirror 52 and a pair of analyzers 54, 56 are substituted for the beam splitter 28 used in the embodiment of FIG. 1. In this case, the planes of the analyzers 54, 56 are perpendicular to each other, and are inclined at 45° with respect to the polarization plane of the incident light beams.

Figure 5:
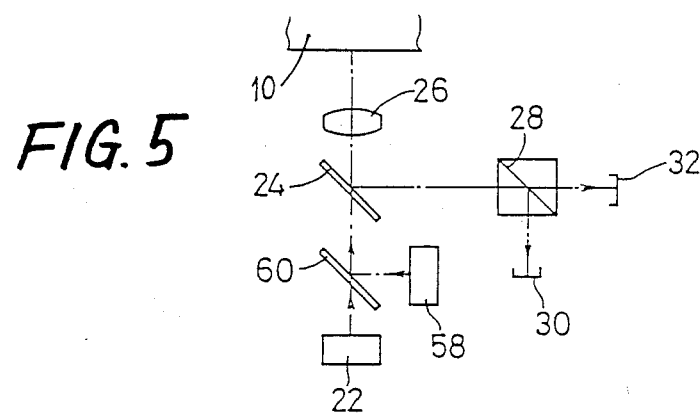

The embodiment shown in FIG. 5 includes another semiconductor laser element 58 for producing a laser radiation which has a different wavelength from that of the radiation produced by the semiconductor laser element 22. The polarization planes of the radiations produced by these two elements 22, 58 are perpendicular to each other. This second laser source 58 is added for writing information on the first and second storage layers 14, 18, where these two layers are spaced apart by the intermediate layer 16 by a relatively large distance. In this case, a half mirror 60 is used to reflect the laser beam from the second semiconductor laser element 58. For improved utilization of the laser radiation produced by the first semiconductor laser element 22, however, this half mirror 60 may be replaced by a beam splitter 60 which is adapted to reflect the laser beam from the second laser element 58 while allowing the radiation from the first laser element 22 to pass.

Figure 6:
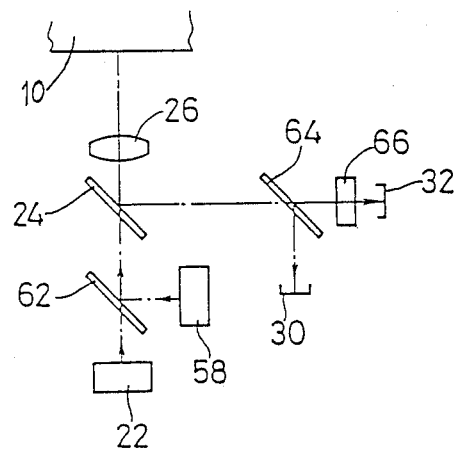

In the embodiment of FIG. 6, the half mirror 60 used in the embodiment of FIG. 5 is replaced by a dichroic mirror 62, and another dichroic mirror 64 is used in place of the beam splitter 28. Further, an analyzer 66 is disposed between the dichroic mirror 64 and the second optical sensor 32. In this instance, the optical information read out from the first storage layer 14, which represents the Kerr rotation angle of the light reflected by the layer 14, is converted by the analyzer 66 into optical information whose intensity corresponds to the Kerr rotation angle.

Although the embodiments of FIGS. 5 and 6 require the two light sources 22, 58, these embodiments use the same circuit as shown in FIG. 2 for processing the output signals from the first and second optical sensors 30, 32.

While the present invention has been described in its presently preferred embodiments, it is to be understood that the invention may be otherwise embodied, without departing from the spirit of the invention.

For instance, it is possible that the first storage layer 14 is disposed on one of opposite sides of the intermediate layer 16 remote from the substrate 12, and the second storage layer 18 is disposed on the other side of the intermediate layer 16 remote from the adhesive layer 20, as previously indicated with respect to the embodiment of FIG. 1.

If the intermediate layer 16 has a relatively small thickness equal to a small fraction of one micron (e.g., one over several tens of one micron), a radiation produced by a single light source may be concurrently focused on both of the first and second storage layers 14, 18. Conversely, if the thickness of the intermediate layer 16 is relatively large, e.g., about 2-3 microns, the intermediate layer 16 effectively functions as an adiabatic layer, and therefore the radiation focused on one of the two storage layers 14, 18 cannot affect the other storage layer.

Other changes and modifications may be made in the invention, within the scope of the invention defined in the following claims.

We claim:

1. An information-reproducing system for reading information from two storage layers of an optical disk, the two storage layers being spaced from each other in a direction of thickness of the optical disk, wherein the information is based on a change in the Kerr rotation angle reflected by one of said two storage layers and on a change in an intensity of radiation reflected by the other of said two storage layers comprising:

a single laser source for irradiating corresponding local areas of said two storage layers of said optical disk with a linearly polarized laser beam having a predetermined wavelength, such that said laser beam is partially reflected by a top one of said two storage layers and partially passes through the top one of said two storage layers, to irradiate the remaining storage layer;

a half mirror disposed in a light path defined between said laser source and said optical disk, for reflecting the laser beam reflected by said two storage layers of the optical disk;

a beam splitter for splitting the laser beam reflected by said half mirror, into a first beam and a second beam which have polarization planes perpendicular to each other;

a first optical sensor and a second optical sensor which are operable to receive said first and second beams and produce first and second output signals, respectively;

a differential amplifier operable to receive said first and second output signals from said first and second optical sensors, and amplify a difference between said first and second output signals, thereby producing an output signal indicative of said change in the angle of Kerr rotation of the radiation reflected by said one of said two storage layers of the optical disk; and an adder operable to add said first and second output signals from said first and second optical sensors, and produce an output signal indicative of said change in the intensity of the radiation reflected by said other storage layer of the optical disk.

2. An information-reproducing system according to claim 1, wherein said one storage layer of said optical disk stores image signals while said another storage layer stores sound signals.

3. An information-reproducing system according to claim 1, further comprising a ½wavelength plate disposed between said half mirror and said beam splitter.

4. An information-reproducing system according to claim 1, wherein said beam splitter includes a half mirror disposed to receive the laser beam reflected from said half mirror disposed in said light path, and operable to produce said first and second beams, and a pair of analyzers whose polarization planes are perpendicular to each other, said pair of analyzers transmitting said first and second beams therethrough toward said first and second optical sensors.

5. An information-reproducing system for reading information from two storage layers of an optical disk, the two storage layers being spaced from each other in a direction of thickness of the optical disk, wherein the information is based on a change in the Kerr rotation angle reflected by one of said two storage layers and on a change in an intensity of radiation reflected by the other of said two storage layers, comprising:
   a first laser source for producing a first linearly polarized laser beam;
   an object lens for converging said first linear polarized laser beam on the one of said two storage layers of the optical disk;
   a first half mirror disposed in a light path between said first laser source and said object lens, for reflecting said first laser beam reflected by said one storage layer;
   a second half mirror disposed in the light path between said first laser source and said object lens;
   a second laser source for emitting a second linearly polarized laser beam toward said second half mirror such that said second laser beam is reflected by said second half mirror, transmitted along said light path and converged on the other of said two storage layers of the optical disk through said object lens, such that a portion of said other storage layer corresponding to a portion of said one storage layer irradiated by said first laser beam is irradiated by said second laser beam, said second laser beam having a wavelength different from that of said first laser beam, and a polarization plane perpendicular to that of said first laser beam, said first hair mirror also reflecting said second laser beam reflected by said other storage layer;
   a beam splitter for splitting each of said first and second laser beams respectively reflected by said two storage layers, into two beams whose polarization planes are perpendicular to each other;
   a first optical sensor and a second optical sensor which are operable to receive said two beams and produce first and second output signals, respectively;
   a differential amplifier operable to receive said first and second output signals from said first and second optical sensors, and amplify a difference between said first and second output signals, thereby producing an output signal indicative of said change in the angle of Kerr rotation of the first laser beam reflected by said one storage layer; and
   an adder operable to add said first and second output signals from said first and second optical sensors, and produce an output signal indicative of said change in the intensity of the second laser beam reflected by said other storage layer.

6. An information-reproducing system for reading information from two storage layers of an optical disk, the two storage layers being spaced from each other in a direction of thickness of the optical disk, wherein the information is based on a change in the Kerr rotation angle reflected by one of said two storage layers and on a change in an intensity of radiation reflected by the other of said two storage layers, comprising:
   a first laser source for producing a first linearly polarized laser beam;
   an object lens for converging said first linearly polarized laser beam on the one of said two storage layers of the optical disk;
   a half mirror disposed in a light path between said first laser source and said object lens, for reflecting said first laser beam reflected by said one storage layer;
   a first dichroic mirror disposed in said light path, between said first laser source and said half mirror;
   a second laser source for emitting a second linearly polarized laser beam toward said first dichroic mirror such that said second laser beam is reflected by said first dichroic mirror, transmitted along said light path and converged on the other of said two storage layers of the optical disk through said object lens, such that a portion of said other storage layer corresponding to a portion of said one storage layer irradiated by said first laser beam is irradiated by said second laser beam, said second laser beam having a wavelength different from that of said first laser beam, and a polarization plane perpendicular to that of said first laser beam, said first half mirror also reflecting said second laser beam reflected by said other storage layer;
   a second dichroic mirror for splitting each of said first and second laser beams respectively reflected by said two storage layers, into two beams whose polarization planes are perpendicular to each other;
   a first optical sensor and a second optical sensor which are operable to receive said two beams and produce first and second output signals, respectively;
   a differential amplifier operable to receive said first and second output signals from said first and second optical sensors, and amplify a difference between said first and second output signals, thereby producing an output signal indicative of said change in the angle of Kerr rotation of the first laser beam reflected by said one storage layer; and
   an adder operable to add said first and second output signals from said first and second optical sensors, and produce an output signal indicative of said change in the intensity of the second laser beam reflected by said other storage layer.

7. An information-reproducing system according to claim 1, wherein said laser beam passes through said one of said two storage layers to irradiate said other storage layer.

8. An information-reproducing system according to claim 1, wherein said two storage layers of the optical disk are concurrently irradiated by said laser beam, to concurrently read the information from said two storage layers, based on said output signals of said differential amplifier and said adder.

9. An information-reproducing system according to claim 5, wherein said second laser beam passes through said one storage layer of the optical disk, to irradiate said other storage layer.

10. An information-reproducing system according to claim 5, wherein said one and other storage layers of the optical disk are concurrently irradiated by said first and second laser beams, respectively, to concurrently read the information from said one and other storage layers, based on said output signals of said differential amplifier and said adder.

11. An information-reproducing system according to claim 6, wherein said second laser beam passes through said one storage layer of the optical disk, to irradiate said other storage layer.

12. An information-reproducing system according to claim 6, wherein said one and other storage layers of the optical disk are concurrently irradiated by said first and second laser beams, respectively, to concurrently read the information from said one and other storage layers, based on said output signals of said differential amplifier and said adder.

* * * * *